United States Patent
Patil et al.

(10) Patent No.: US 10,694,573 B1
(45) Date of Patent: Jun. 23, 2020

(54) SYSTEM AND METHOD OF RADIO RESOURCE MANAGEMENT FOR RADIO ACCESS NETWORKS

(71) Applicant: Verizon Patent and Licensing Inc., Arlington, VA (US)

(72) Inventors: Sudhakar Reddy Patil, Flower Mound, TX (US); Amir Saghir, Frisco, TX (US); Frank Jager, Chester, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/220,627

(22) Filed: Dec. 14, 2018

(51) Int. Cl.
| | |
|---|---|
| H04W 4/00 | (2018.01) |
| H04W 76/27 | (2018.01) |
| H04W 76/38 | (2018.01) |
| H04L 12/803 | (2013.01) |
| H04L 12/833 | (2013.01) |
| H04L 12/865 | (2013.01) |
| H04W 72/12 | (2009.01) |

(52) U.S. Cl.
CPC ........... H04W 76/27 (2018.02); H04L 47/125 (2013.01); H04L 47/2458 (2013.01); H04L 47/6275 (2013.01); H04W 72/1247 (2013.01); H04W 76/38 (2018.02)

(58) Field of Classification Search
CPC ........... H04W 47/125; H04W 47/2458; H04W 47/6275; H04W 68/02; H04W 68/06; H04W 74/0833; H04W 76/27; H04W 76/38; H04W 72/1247; H04W 92/20
See application file for complete search history.

(56) References Cited

U.S. PATENT DOCUMENTS

| | | | | |
|---|---|---|---|---|
| 2016/0095065 A1* | 3/2016 | Richards | ........... | H04W 28/0252 370/311 |
| 2016/0309379 A1* | 10/2016 | Pelletier | ................ | H04W 76/27 |
| 2018/0102871 A1* | 4/2018 | Wu | ........................ | H04L 1/0014 |
| 2018/0139778 A1* | 5/2018 | Chou | .................... | H04W 76/27 |
| 2018/0234941 A1* | 8/2018 | Kim | .................... | H04W 68/005 |
| 2018/0302813 A1* | 10/2018 | Hahn | .................... | H04W 24/08 |

* cited by examiner

*Primary Examiner* — Minh Trang T Nguyen

(57) ABSTRACT

A system and method provide for receiving, at a radio access network (RAN), a radio resource connection (RRC) connection request from user equipment (UE) in a disconnected/idle state; allocating signaling radio bearer (SRB) resources to the UE; sending an initial UE message to a core network; receiving an initial context set-up from the core network; establishing an RRC session with the UE in an RRC connected state; storing the context information; detecting inactivity in the RRC session while the UE is in the RRC connected state; suspending the RRC session and transitioning the UE device from the RRC connected state to an RRC inactive state based on the inactivity; determining a congested/overloaded state in the RAN; receiving an RRC resume request from the UE; and determining, using the stored context information, whether the UE is to be granted prioritized access to the RAN and transitioned to the RRC connected state.

20 Claims, 9 Drawing Sheets

RRC STATES/TRANSITIONS

SYSTEM AND METHOD OF RADIO RESOURCE MANAGEMENT FOR RADIO ACCESS NETWORKS

BACKGROUND INFORMATION

Radio access networks (RANs) operated by wireless network providers provide shared, finite radio resources that are generally accessible to user devices via the air interface. RANs are susceptible to congestion and/or overload when the maximum number of radio links, i.e., signaling radio bearer (SRB) resources, have been established and/or the limited available bandwidth has been allocated to connected, Radio Resource Control (RRC) active user devices, i.e., data radio bearer (DRB) resources. During congestion/overload conditions in the RAN, when RRC protocol Connection Request messages are received from additional user devices seeking access, via an evolved NodeB (eNB) or a next generation NodeB (gNB), the eNB/gNB must support services designated as high priority, such as public safety and emergency communications users, etc. However, the RAN cannot simply rely on the Access Class information provided by the UE as being legitimate in determining a prioritization level associated with any given access request.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to controlling prioritized access to RAN resources. In an exemplary implementation, prioritized access is controlled in a prescribed manner that provides a technological improvement over the current state of the art in scheduling of RAN resources in a congested/overloaded RAN, and thereby advantageously conserves bandwidth and reduces messaging traffic in the RAN.

Preemption and admission priority are some of the mechanisms available to RANs to enforce access prioritization during congestion/overload. For example, RANs may use allocation and retention priority (ARP) information for a user device requesting prioritized access to deny/grant the request. Currently, because such information is not stored by RANs, the RAN must first set up signaling radio bearers (SRBs) to the user device, and then request the information from the core network responsive to each initiation of an RRC connection during congestion/overload in the RAN.

Current radio resource management has a number of technological disadvantages. For example, if the RAN is SRB congested, the RAN is not able to allocate SRB resources to the user device and may reject the access attempt without first identifying the prioritized access that may be due the user device. On the other hand, if SRB resources are available and are allocated by the RAN, these resources will be wasted in situations where the RAN ultimately determines that prioritized access is not due. Also, signaling communications with the core network creates additional network traffic in an already congested/overloaded RAN, and adds unnecessary delay to the response. Further, reserving RAN resources in advance of receiving actual requests will result in less than optimal use of the resources available. Implementations described herein provide technological solutions and efficiencies over the above-mentioned technological challenges.

Figure 1:
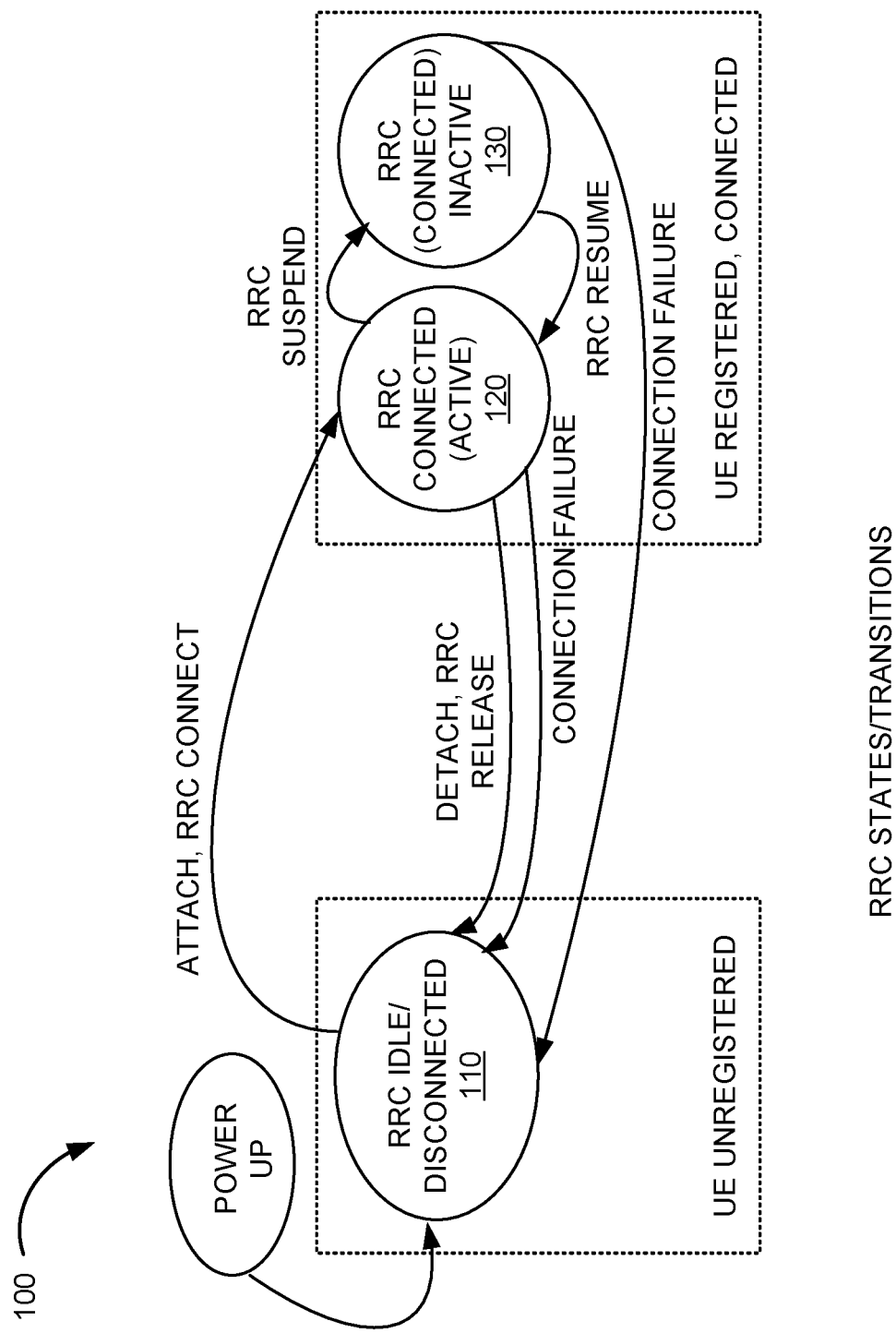
FIG. 1 is a diagram illustrating possible RRC states of user devices with respect to a RAN in accordance with an exemplary implementation.

Referring to FIG. 1, 3rd Generation Partnership Project (3GPP) standards for Fifth Generation (5G) define RRC states/transitions 100 for user equipment (UE) with respect to a RAN. At power up, a user device may be unregistered with the RAN, and may assume an RRC idle or disconnected state 110. The user device may, upon attachment and registration via an RRC connection, transition to an RRC connected (active) state 120. 5G standards introduce a third state, RRC (connected) inactive state 130, to reduce the control plane latency. For example, periods of inactivity in the RRC connected state result in the RRC session being suspended and the user device being transitioned to the RRC inactive state, in which the user device is still registered and connected to the RAN, unlike the idle state where the user device is disconnected and deregistered from the RAN. Fourth Generation (4G) networks supports a similar approach as part of User Plane Optimization. RRC states and/or transitions other than what are depicted in FIG. 1 are possible.

Implementations described herein include the technological solution of the RAN storing user device context even when the user device is not in the RRC connected state 520. That is, when an RRC session for the user device is suspended as described in more detail below, and the user device is placed in the RRC inactive state 530, the RAN may store the context information obtained from the core network. At this point, should the user device resume activity in the RRC session, the RAN may use the context information to determine whether the inactive user device is due prioritized access when the RAN is under congested/overload conditions. In this manner, prioritized network access can be effectively controlled using a less resource-intensive process than currently practiced.

Figure 2:
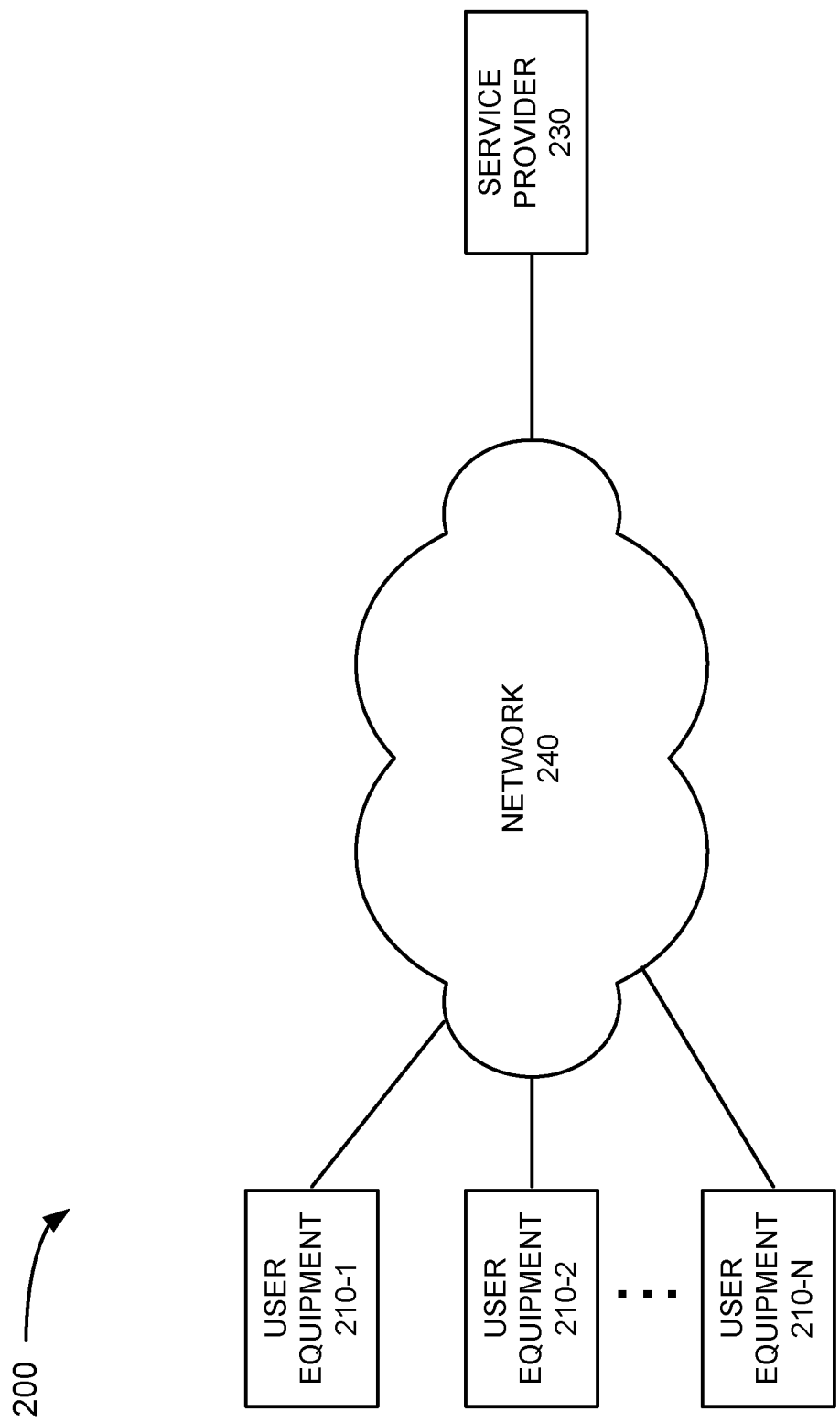
FIG. 2 illustrates an exemplary environment in which systems and methods described herein may be implemented.

FIG. 2 is a block diagram of an exemplary environment 200 in which systems and methods described herein may be implemented. Environment 200 may include user equipment (UE) 210-1 through 210-N, service provider 230, and network 240.

UEs 210-1 through 210-N (individually referred to as UE 210-x, UE 210 or UE device 210, and collectively as UEs 210 or UE devices 210) may include a mobile device, such as wireless or cellular telephone device (e.g., a conventional cell phone with data processing capabilities), a smart phone, a personal digital assistant (PDA) that can include a radiotelephone, etc. UEs 210 may also include any type of mobile computer device or system, such as a personal computer (PC), a laptop, a tablet computer, a notebook, a netbook, a wearable computer (e.g., a wrist watch, eyeglasses, etc.), a game playing device, a music playing device, a home appliance device, a home monitoring device, etc., that may include communication functionality. UEs 210 may further include Internet of things (IoT) devices, such as narrow band IoT devices operating in accordance with the 3GPP standard, devices employing machine-to-machine (M2M) communication, such as Machine-Type Communication (MTC), a type of M2M communication standard developed by the 3GPP.

UEs 210 may connect to network 240 via an air interface and to other devices in environment 200 (e.g., service provider 230) via any conventional technique, such as wired, wireless, optical connections or a combination of these techniques. UE 210 and the entity associated with UE 210 (e.g., the user of UE 210) may be referred to collectively as UE 210 in the description below.

Service provider 230 may include one or more computer devices and systems associated with providing wireless services via network 240. For example, service provider 230 may be an entity associated with operating network 240. Service provider 230 may maintain information regarding service plans for large numbers of users (also referred to herein as customers or subscribers) and manage network resource usage by the users. For example, service provider 230 may store user profiles that include subscription priority associated with each UE 210. The subscription priority may enable the RAN to selectively provide prioritized access to network resources in congested/overloaded conditions. Service provider 230 may communicate with elements of network 240 to selectively provide prioritized access to network resources, as described in more detail below.

Network 240 may include one or more wired, wireless and/or optical networks that are capable of receiving and transmitting data, voice and/or video signals. For example, network 140 may include one or more public switched telephone networks (PSTNs) or other type of switched network. Network 240 may also include one or more wireless networks and may include a number of transmission towers for receiving wireless signals and forwarding the wireless signals toward the intended destination. Network 240 may further include one or more satellite networks, one or more packet switched networks, such as an Internet protocol (IP) based network, a local area network (LAN), a wide area network (WAN), a personal area network (PAN), a long term evolution (LTE) network, a 4G network, a next generation, e.g., (5G) network, a WiFi network, a Bluetooth network, an intranet, the Internet, or another type of network that is capable of transmitting data. Network 240 provides wireless packet-switched services and wireless Internet protocol (IP) connectivity to UEs 210 to provide, for example, data, voice, and/or multimedia services.

The exemplary configuration illustrated in FIG. 2 is provided for simplicity. It should be understood that a typical environment 200 may include more or fewer devices than illustrated in FIG. 2. For example, environment 200 may include a large number (e.g., thousands or more) of UEs 210 and multiple service providers 230. In addition, network 240 may include additional elements, such as eNBs, gNBs, base stations, switches, gateways, routers, monitoring devices, etc., that aid in routing data and determining whether to grant/deny prioritized access to network resources, as described in detail below.

In addition, various functions are described below as being performed by particular components in environment 200. In other implementations, various functions described as being performed by one device may be performed by another device or multiple other devices, and/or various functions described as being performed by multiple devices may be combined and performed by a single device.

Figure 3:
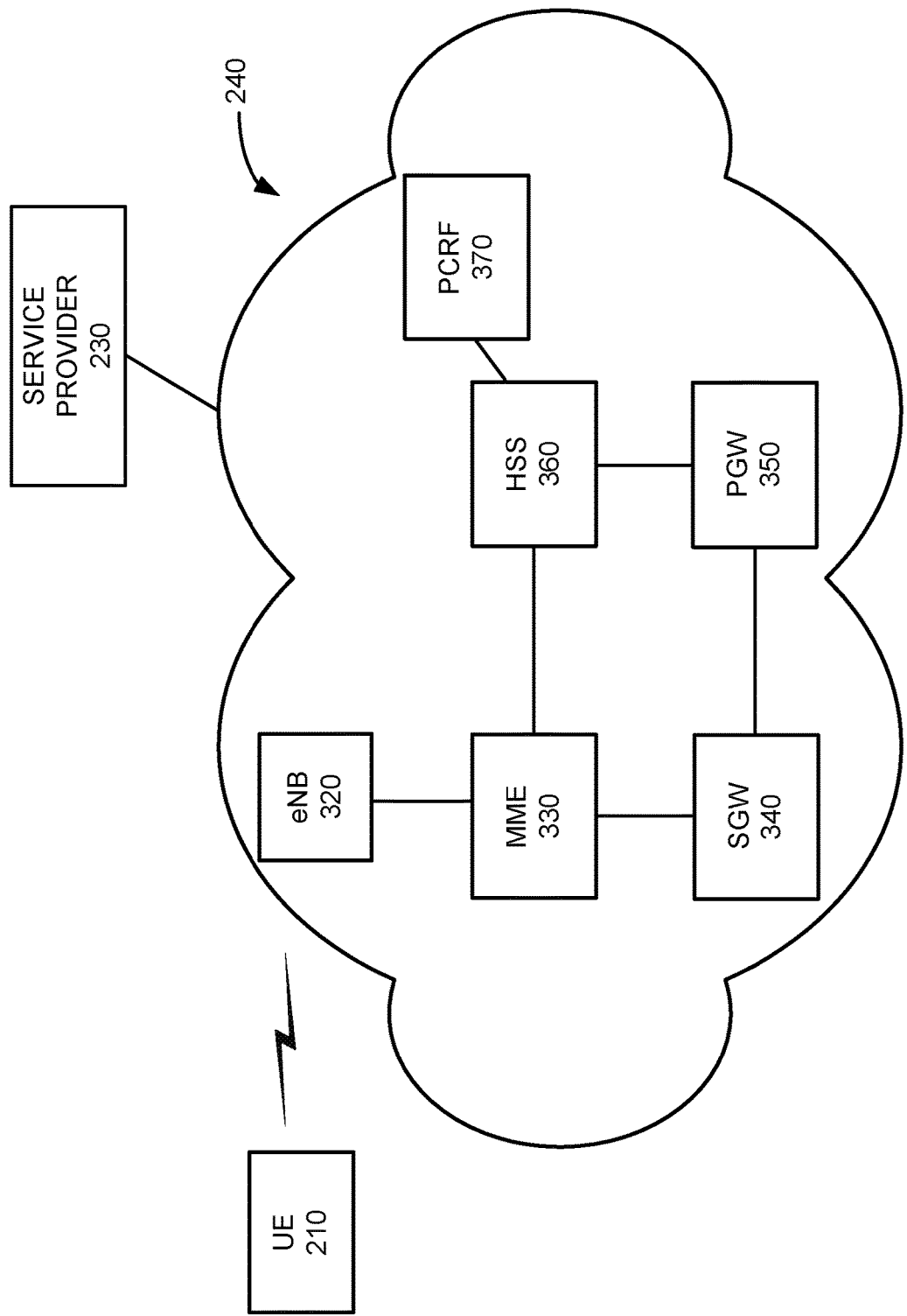
FIG. 3 illustrates an exemplary configuration of components implemented in a portion of the network of FIG. 2.

FIG. 3 is an exemplary block diagram illustrating a portion of network 240. In the implementation depicted in FIG. 3, network 240 is a long term evolution (LTE) network. For example, network 240 may be a 4G network implementing User Plane Optimization developed by the 3GPP. It should be understood, however, that embodiments described herein may operate in other types of wireless networks. For example, network 240 may be a next generation network, such as a 5G network, which includes a new radio core network (NG Core).

Network 240 may include an evolved packet core (ePC) connected to an evolved Node B (eNB) 320, mobile management entity (MME) 330, serving gateway (SGW) 340, packet gateway (PGW) 350, home subscriber server (HSS) 360 and policy charging rules function (PCRF) 370. eNB 320 may be part of an evolved Universal Mobile Telecommunications System (UMTS) Terrestrial Radio Access Network (eUTRAN). In one embodiment, network 240 may include a 5G network and include a NextGen core (5GC) connected to a next generation NodeB (gNB).

eNB 320 may include one or more devices and other components having functionality that allow UEs 210 to wirelessly connect to network 240. eNB 320 may be associated with one or more cells/sectors. For example, each cell or sector in network 240 may include one or more radio frequency (RF) transceivers pointed in a particular direction. Alternatively, where network 240 is a 5G network, eNB 320 may instead be a gNB associated with one or more cells/sectors.

eNB 320 may interface with MME 330. MME 330 may include one or more devices that implement control plane processing for network 240. For example, MME 330 may implement tracking and paging procedures for UEs 210, may activate and deactivate bearers for UEs 210, may authenticate respective users of UEs 210, and may interface with non-LTE radio access networks. Alternatively to MME 330, the core network (e.g., 5GC) may include an access and mobility management function (AMF) device.

A bearer may represent a logical channel with particular quality of service (QoS) requirements, and can be used in some embodiments to control packet flows as described herein. MME 330 may also select a particular SGW 340 for a particular UE 210. MME 330 may interface with other MME devices (not shown) in network 240 and may send and receive information associated with UEs 210, which may allow one MME 330 to take over control plane processing of UEs 210 serviced by another MME 330, if the other MME 330 becomes unavailable.

SGW 340 may provide an access point to and from UEs 210, may handle forwarding of data packets for UEs 210, and may act as a local anchor point during handover procedures between eNBs 320. SGW 340 may interface with PGW 350. PGW 350 may function as a gateway to a core network, such as a wide area network (WAN) (not shown) that allows delivery of Internet protocol (IP) services to UEs 210.

HSS 360 may store information associated with UEs 210 and/or information associated with users of UEs 210. For example, HSS 360 may store user profiles that include authentication and access authorization information. Each user/subscription profile may include a list of UEs 210 associated with the subscriptions as well as an indication of which UEs 210 are active (e.g., authorized to connect to network 240). HSS 360 may also store profile information corresponding to modes or categories of use for UEs 210, and ARP parameters associated with the modes or categories of use, as described in detail below. Alternatively to HSS 360, the core network (e.g., 5GC) may include a unified data management (UDM) device.

PCRF 370 may implement policy charging and rule functions, such as providing quality of service (QoS) requirements, bandwidth and/or charges for a particular service for UEs 210. PCRF 370 may determine how a certain service data flow will be treated, and may ensure that user plane traffic mapping and treatment is in accordance with a user's subscription profile.

Although FIG. 3 shows exemplary components of network 240, in other implementations, network 240 may include fewer components, different components, differently arranged components, or additional components than depicted in FIG. 3. For example, network 240 may include a large number of eNBs 320, MMEs 330, SGWs 340, PGWs 350, HSSs 360, and PCRFs 370. Additionally, or alternatively, one or more components of network 240 may perform functions described as being performed by one or more other components.

Figure 4:
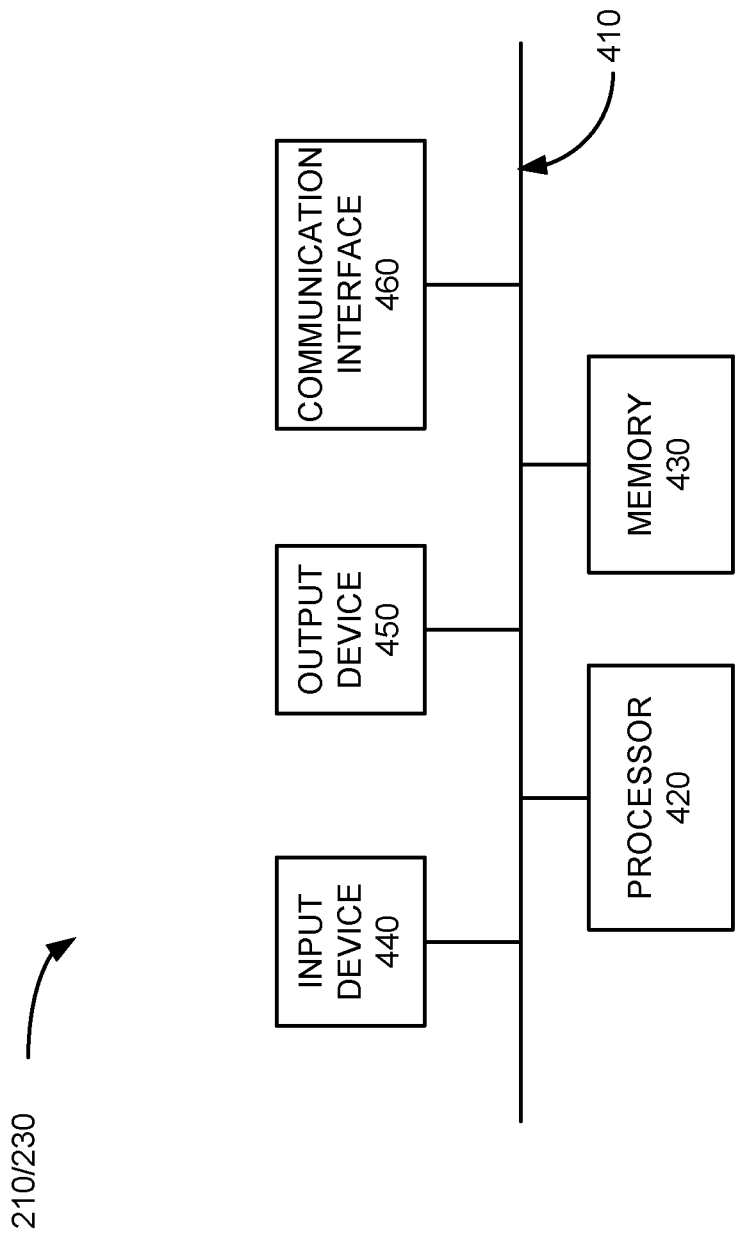
FIG. 4 illustrates an exemplary configuration of logic components included in one or more of the devices of FIG. 2 and FIG. 3.

FIG. 4 illustrates an exemplary configuration of UE 210. Other devices in environment 200, such as service provider 230 may be configured in a similar manner. In addition, in some implementations, devices in network 240, such as eNB 320, MME 330, SGW 340, PGW 350, HSS 360, and PCRF 370 may be configured in a similar manner. Referring to FIG. 4, UE 210 may include bus 410, processor 420, memory 430, input device 440, output device 450, and communication interface 460. Bus 410 may include a path that permits communication among the elements of UE 210.

Processor 420 may include one or more processors, microprocessors, or processing logic that may interpret and execute instructions. Memory 430 may include a random access memory (RAM) or another type of dynamic storage device that may store information and instructions for execution by processor 420. Memory 430 may also include a read only memory (ROM) device or another type of static storage device that may store static information and instructions for use by processor 420. Memory 430 may further include a solid state drive (SDD). Memory 430 may also include a magnetic and/or optical recording medium (e.g., a hard disk) and its corresponding drive.

Input device 440 may include a mechanism that permits a user to input information to UE 210, such as a keyboard, a keypad, a mouse, a pen, a microphone, a touch screen, voice recognition and/or biometric mechanisms, etc. Output device 450 may include a mechanism that outputs information to the user, including a display (e.g., a liquid crystal display (LCD)), a printer, a speaker, etc. In some implementations, a touch screen display may act as both an input device and an output device.

Communication interface 460 may include one or more transceivers that UE 210 (service provider 230 or devices in network 240) uses to communicate with other devices via wired, wireless, or optical mechanisms. For example, communication interface 460 may include one or more radio frequency (RF) transmitters, receivers and/or transceivers and one or more antennas for transmitting and receiving RF data via network 240. Communication interface 460 may also include a modem or an Ethernet interface to a LAN or other mechanisms for communicating with elements in a network, such as network 240 or another network.

The exemplary configuration illustrated in FIG. 4 is provided for simplicity. It should be understood that UE 210 (service provider 230 or devices in network 240) may include more or fewer devices than illustrated in FIG. 4. In an exemplary implementation, UE 210 (or other devices in environment 200) performs operations in response to processor 420 executing sequences of instructions contained in a computer-readable medium, such as memory 430. A computer-readable medium may be defined as a physical or logical memory device. The software instructions may be read into memory 430 from another computer-readable medium (e.g., a hard disk drive (HDD), SSD, etc.), or from another device via communication interface 460. Alternatively, hard-wired circuitry may be used in place of or in combination with software instructions to implement processes consistent with the implementations described herein. Thus, implementations described herein are not limited to any specific combination of hardware circuitry and software.

Figure 5:
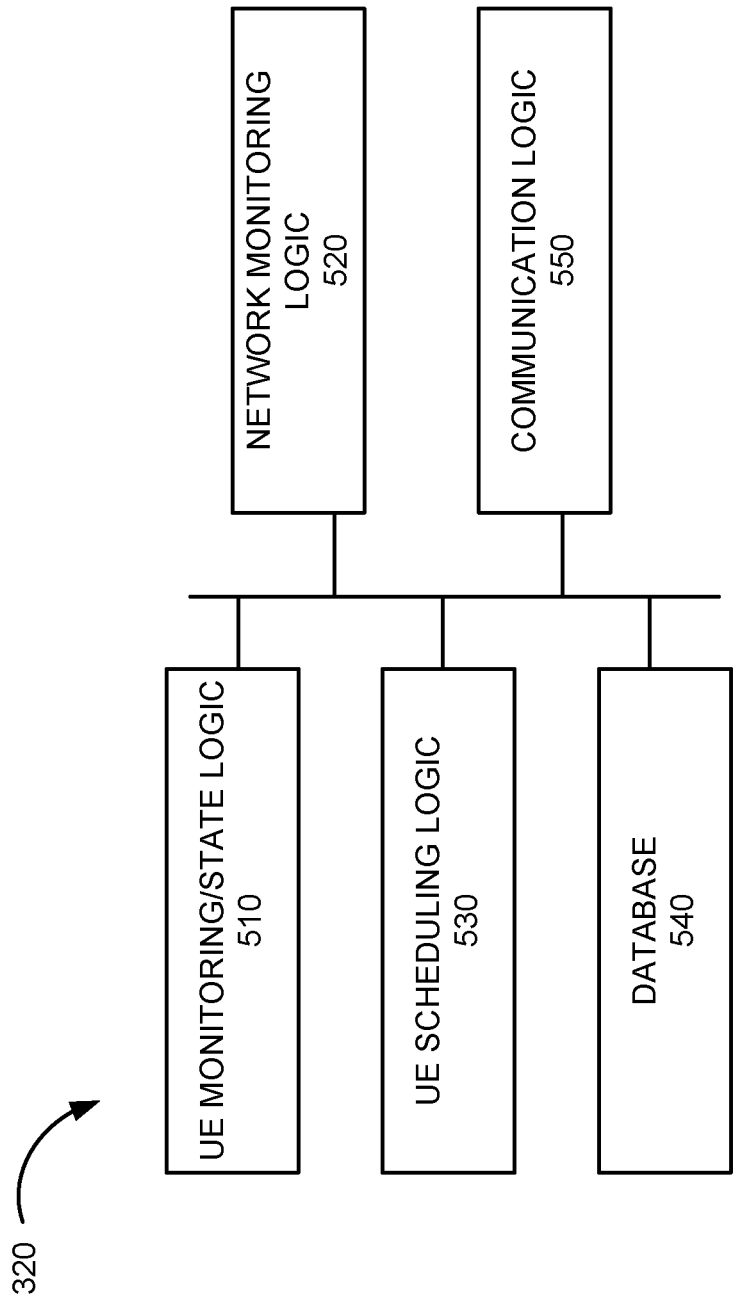
FIG. 5 illustrates an exemplary configuration of logic components implemented by one of the devices of FIG. 2.

FIG. 5 is an exemplary functional block diagram of components implemented in eNB 320. In an exemplary implementation, all or some of the components illustrated in FIG. 5 may be implemented by processor 420 executing software instructions stored in memory 430.

eNB 320 may include UE monitoring/state logic 510, network monitoring logic 520, UE scheduling logic 530, database 540, and communication logic 550. In alternative implementations, these components or a portion of these components may be located externally with respect to eNB 220, such as within one or more elements of network 240 (e.g., HSS 360) and/or service provider 230. In addition, in other implementations, the components illustrated in FIG. 5 may be implemented in a 5G network, such as within a gNB.

UE monitoring/state logic 510 may include a state machine that defines state transitions for an RRC connected (active) state, an RRC (connected) inactive state, and an RRC idle (disconnected) state for a radio communication session of UE 210 via eNB 320. In one example embodiment, UE monitoring/state logic 510 may include timing logic to monitor periods of session inactivity for UE 210 operating in the RRC connected state with eNB 320. When the timing logic determines that a period of inactivity exceeds a predetermined threshold period (e.g., N seconds, where N is any positive integer), UE monitoring/state logic 510 may suspend the RRC connection to UE 210, and transition UE 210 to the RRC inactive state (e.g., state 130, FIG. 1). From the RRC inactive state, UE monitoring/state logic 410 may transition UE 210 to either the RRC idle state (e.g., state 110) or back to the RRC connected state (e.g., state 120). For example, the timing logic may determine that the period of inactivity for the session exceeds another threshold period, and UE monitoring/state logic 510 may transition UE 210 to the RRC idle state based on the inactivity. Alternatively, or additionally, the timing logic may detect session activity that occurs prior to the other predetermined threshold period, and UE monitoring/state logic 510 may transition UE 210 to the RRC connected state based on the detected session activity.

Network monitoring logic 520 may include logic to determine parameters associated with the RAN, such as the capacity of the RAN, whether the RAN is overloaded, lightly loaded, etc. Network monitoring logic 520 may determine congestion and/or overload conditions, for example, when the maximum number of radio links (e.g., established signaling radio bearers) at eNB 320 have been established and/or the limited available bandwidth has been allocated by eNB 320 to RRC connected UEs 210 (e.g., established data radio bearers).

UE scheduling logic 530 may use the network loading information from network monitoring logic 520 to determine whether idle/disconnected UEs 210 can be granted access (e.g., prioritized access or normal access) to RAN resources. In one implementation, UE scheduling logic 530 may, in response to an RRC request received during congested/overload conditions at eNB 320, use allocation and retention priority (ARP) parameter values associated with idle/disconnected UE 210 to deny/grant the RRC request. For example, UE scheduling logic 430 may determine to deny/grant the RRC request based on preemption capability information (PCI) and a priority level (PL) associated with idle/disconnected UE 210, and/or based on preemption vulnerability information (PVI) and the PL associated with one or more UE 210 in a connected state or an inactive state in the RAN. In one implementation, UE scheduling logic 530 may use context for UE 210, which is retrieved from database 540 as described in more detail below.

Database 540 may include one or more data storage devices that store one or more databases of information associated with network 240. For example, as described above, eNB 320 may retrieve from the service provider's core network, initial context setup information including ARP parameter values, as well as subscription priority information for each UE 210. In one embodiment, database 540 stores ARP and subscription priority information for each UE 210 that includes a non-zero PCI value and/or a PL above a threshold value. The stored information for UE 210 may be used by UE scheduling logic 530 in a congested/overload state of eNB 320, to determine whether an RRC request from UE 210 that has moved to an idle state, should be granted or denied.

Communication logic 550 may include logic to allow eNB 320 to communicate with other devices in environment 200, such as elements of network 240. For example, communication logic 550 may receive user profile information (ARP parameters, subscription priority, etc.) from MME 330 and/or other devices in network 240, as described above.

Although FIG. 5 shows exemplary components of eNB 320, in other implementations, eNB 320 may include fewer components, different components, differently arranged components, or additional components than depicted in FIG. 5. In addition, functions described as being performed by one of the components in FIG. 5 may alternatively be performed by another one or more of the components of eNB 320 and/or network 240.

Figure 6:
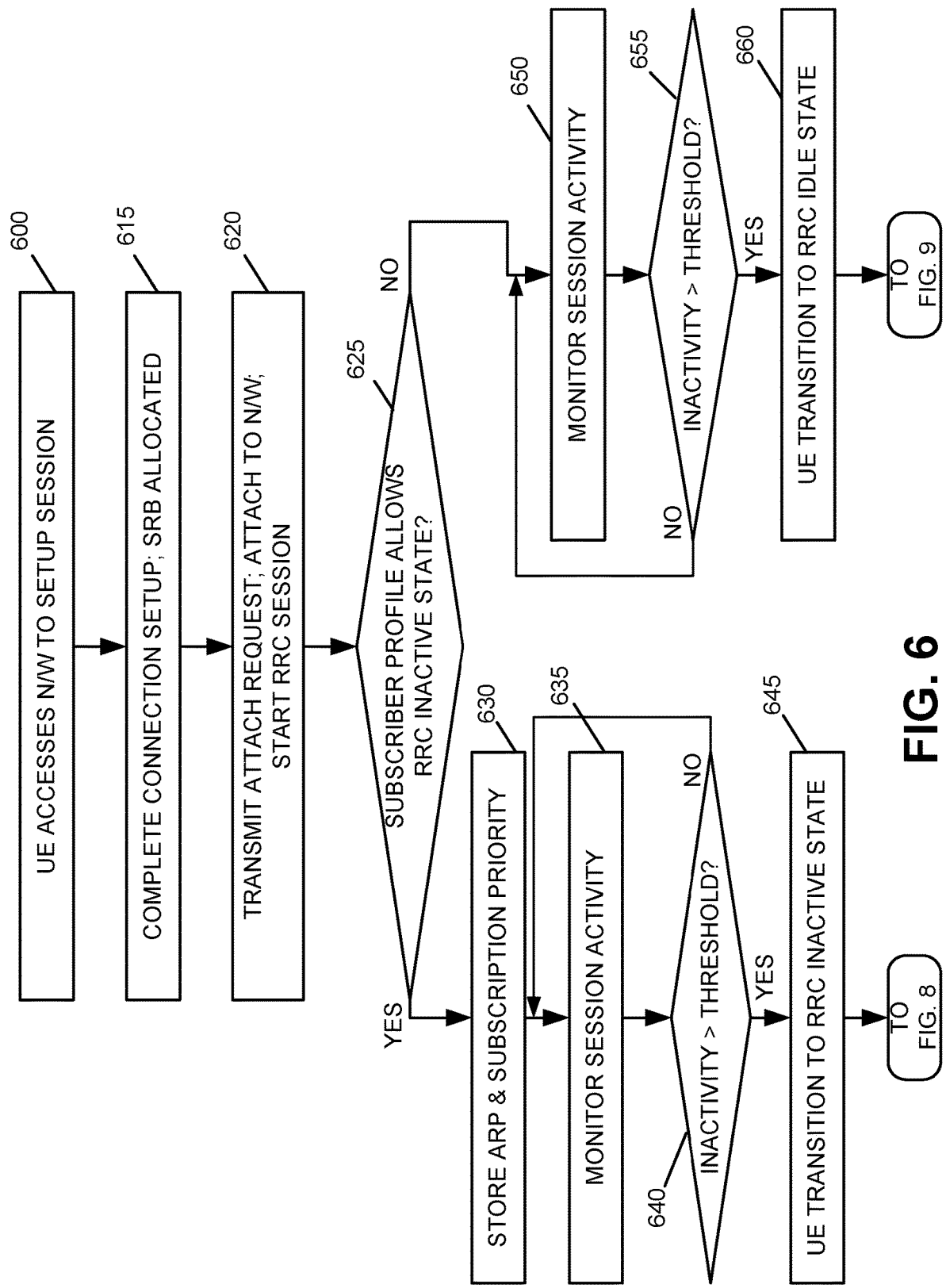
FIGS. 6, 8, and 9 are flow diagrams illustrating processing associated with radio resource management in accordance with an exemplary implementation.
Figure 7:
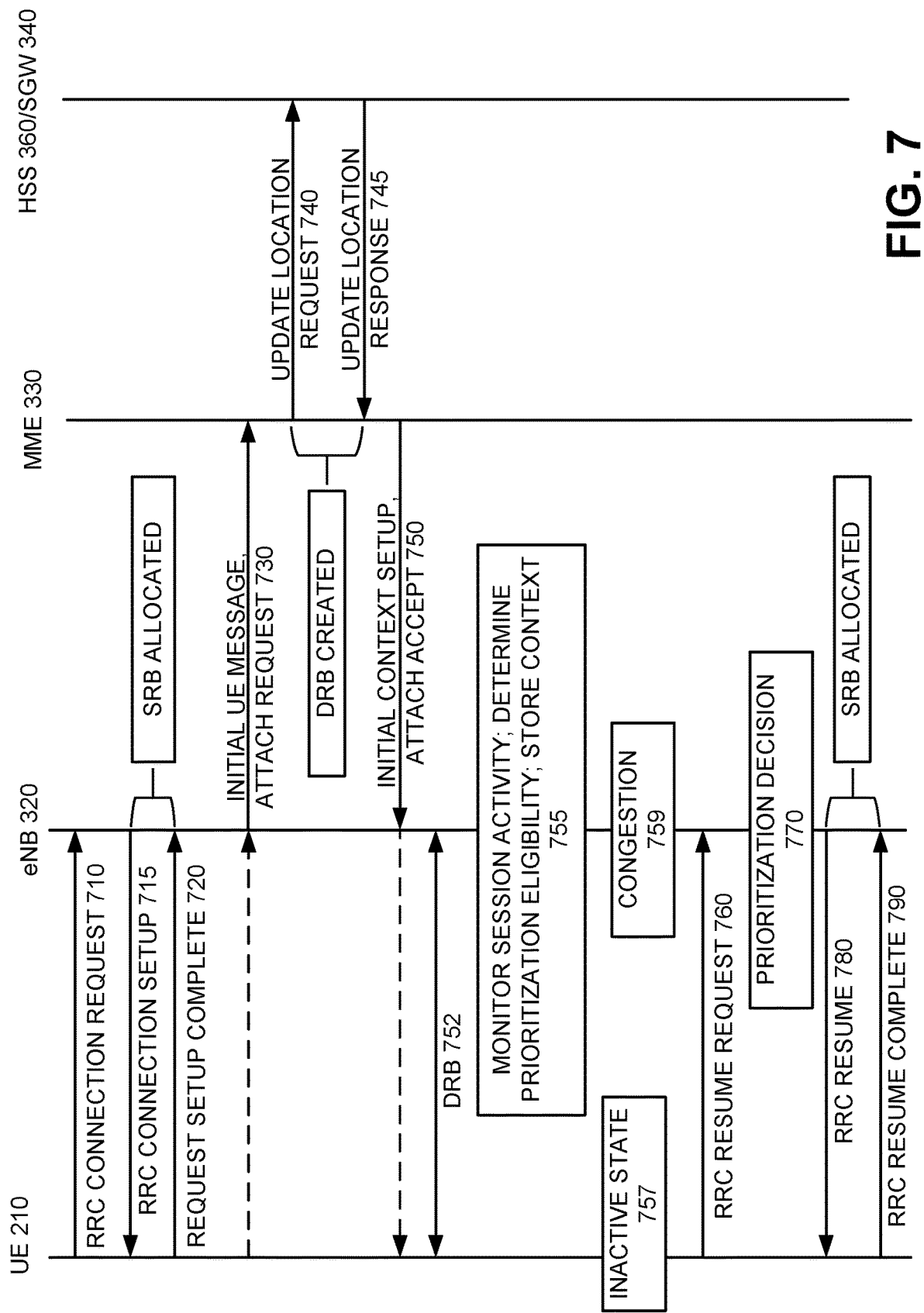
FIG. 7 is a signal flow diagram associated with the processing of FIGS. 6, 8, and 9.
Figure 8:
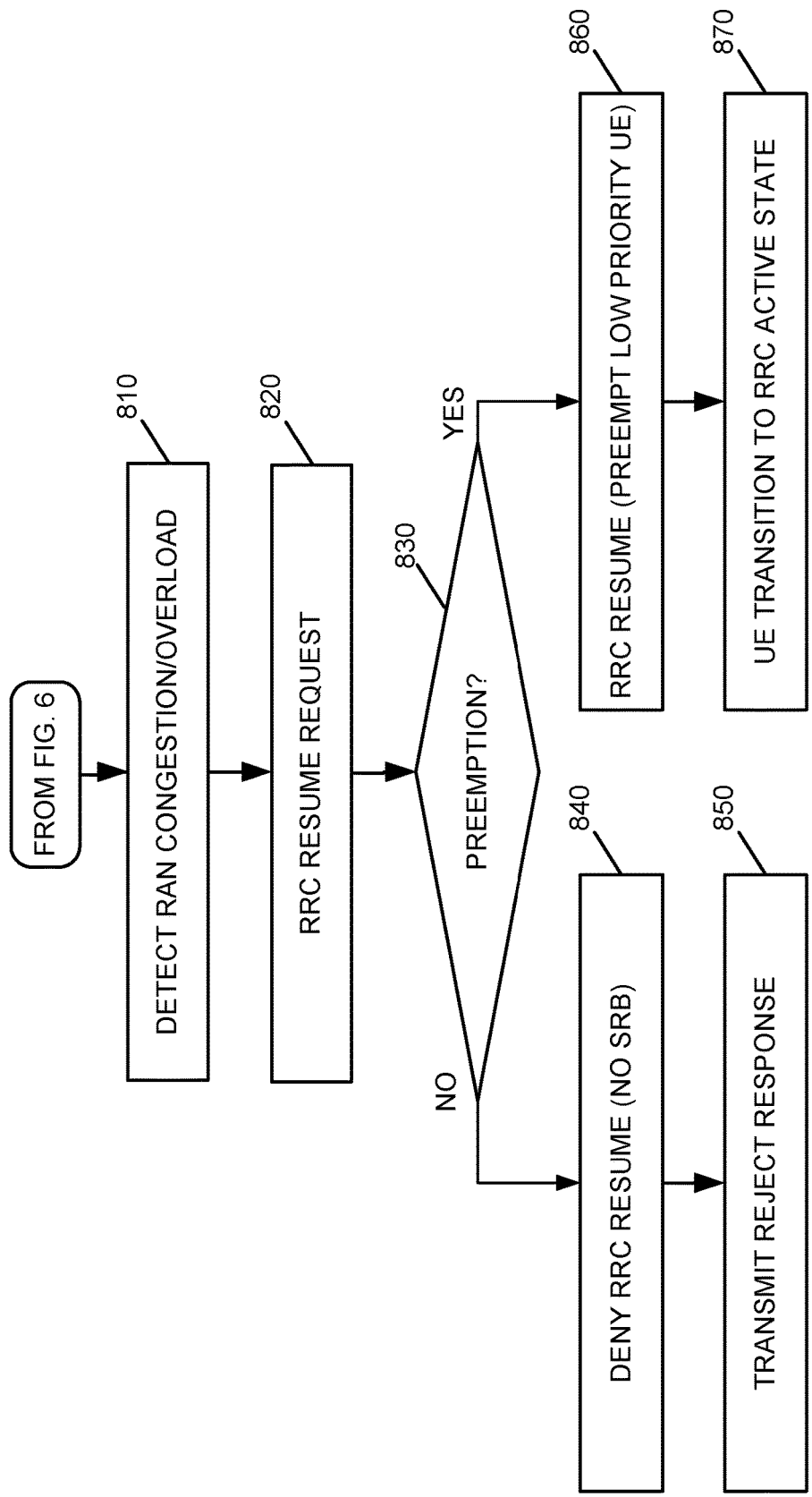
Figure 9:
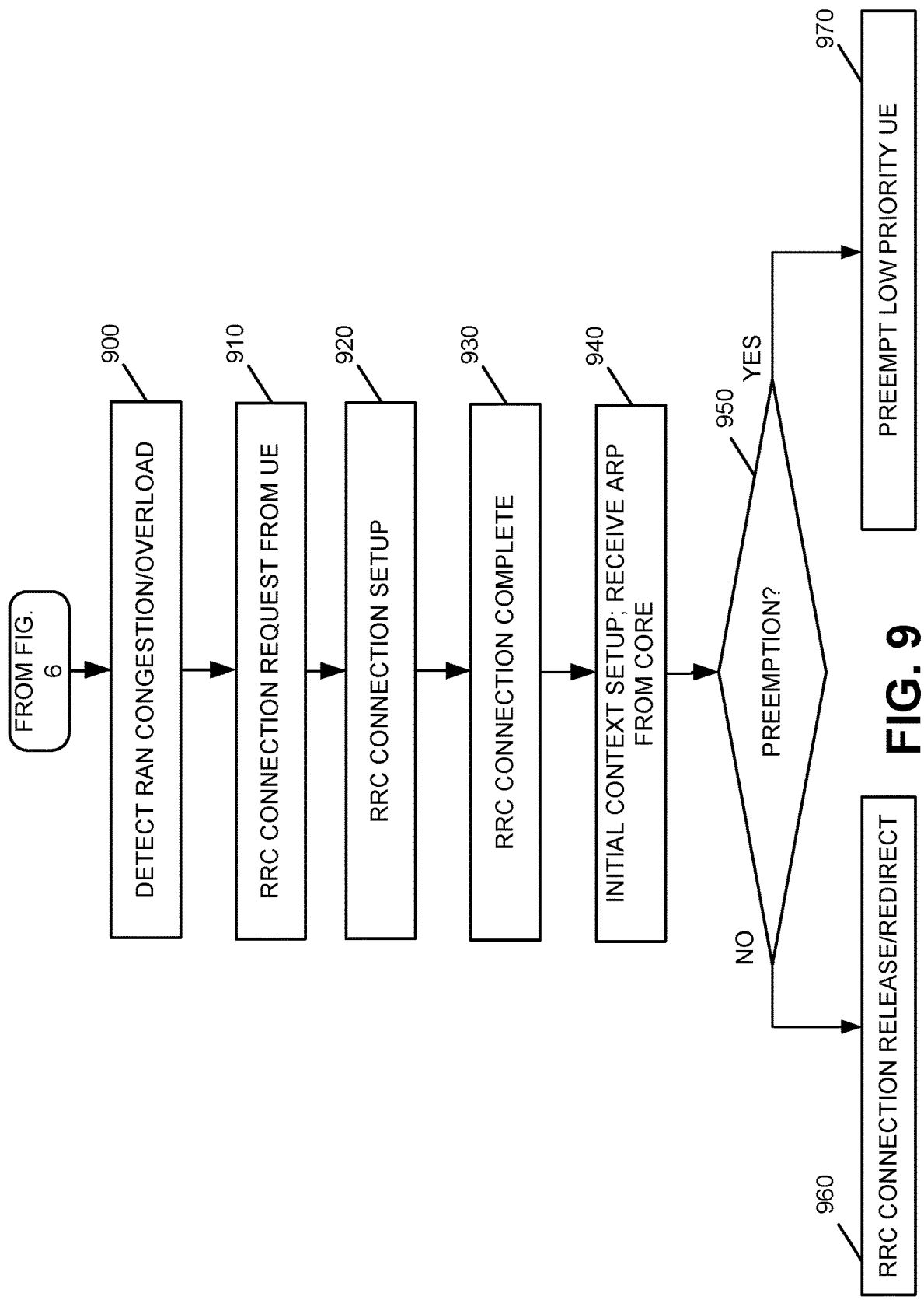

FIGS. 6, 8, and 9 are flow diagrams illustrating processing associated with UE 210 accessing network 240. The flow diagrams of FIGS. 6, 8, and 9 are described in conjunction with the signal flow diagram of FIG. 7.

Processing may begin with UE 210 accessing network 240 and attempting to setup a network session via a RAN (block 610). For example, UE 210 may transmit an RRC Connection Request message to eNB 320 (FIG. 7, 710). The RRC Connection Request message may include information elements corresponding to the identity of UE 210, including, for example, an access class. Assume that eNB 320 has determined that the RAN is not in a congested/overload state (i.e., detected normal traffic conditions). eNB 320 may receive the Connection Request message and transmit an RRC Connection Setup message to UE 210 (FIG. 7, 715). Upon receiving RRC Connection Setup message, assume that UE 210 responds by sending an RRC Setup Complete message to eNB 320, indicating that the RRC Connection Setup is complete, and thereby signaling radio bearer (SRB) resources are allocated to UE 210 by eNB 320 (block 620, FIG. 7, 720).

Once the RRC is setup, UE 210 may transmit an S1 Application Protocol (AP) Initial UE message, via eNB 320, which includes a non-access stratum (NAS) Attach Request to MME 330 (block 630; FIG. 7, 730). MME 330 receives the Attach Request and sends an update location request message to HSS 360 (FIG. 7, 740). HSS 360 may then update the location associated with UE 210, transmit the Update Location Response to MME 330, and in create data radio bearers (DRBs) (FIG. 7, 745). The Update Location Response may include subscriber profile data and an International Mobile Subscriber Identity (IMSI) group ID. In accordance with an exemplary implementation, the subscriber profile data includes information provided by PCRF 370 via HSS 360 and identifies a subscription priority with respect to prioritized access to network 240, and may indicate that the RRC inactive state is to be enabled for UE 210.

MME 330 may receive the Update Location Response and send an Initial Context Setup Attach Accept message to eNB 320 (FIG. 7, 750), which may then be forwarded to UE 210 (as shown by the dotted line in FIG. 7). DRB resources may be allocated to UE 210, and UE 210 may then transmit data via network 240 using the DRB resources during a data session (block 630; FIG. 7, 752). For example, UE 210 may use IP multimedia core network subsystem (IMS) services via the RRC connection.

eNB 220 may determine whether the subscriber profile data allows UE 220 to be placed in the RRC inactive state (block 625). If eNB 220 determines that UE 210 is allowed to enter the RRC inactive state (block 625—YES), then eNB 220 may store the context information for UE 210 (block 630). Alternatively, if eNB 220 determines that UE 210 is not allowed to enter the RRC inactive state (block 625—NO), then the context information for UE 210 may not be stored by eNB 220.

In either case, eNB 320 monitors the network session for activity (blocks 635, 650; FIG. 7, 755). eNB 320 determines whether a period of inactivity exceeds a predetermined threshold amount of time (blocks 640, 655). When eNB 320 detects additional session activity before the period of session inactivity exceeds the threshold (block 640—NO or block 655—NO), the process may return to block 635 or block 650, and UE 210 may remain in the RRC connected state. For UE 210 that may be placed in the RRC inactive state, when the period of session inactivity exceeds the threshold (block 640—YES), according to the Context information for UE 210, eNB 320 places UE 210 in the RRC inactive state (block 645; FIG. 7, 757). Alternatively, for UE 210 that cannot be placed in the RRC inactive state, when the period of session inactivity exceeds the threshold (block 655—YES), eNB 320 places UE 210 in the RRC idle state (block 660)

In one embodiment, eNB 320 may use Context information to determine whether UE 210 is eligible for prioritized access. eNB 320 may also store the Context information, including the ARP parameter values and/or the subscription priority information, based on eNB 320 determining that UE 210 is eligible for prioritized access to the RAN. Prioritized access may be determined from ARP values and/or subscription priority values that exceed a threshold value(s). Alternatively, eNB 320 may not store Context information for UE 210 when UE 210 is not eligible for prioritized access, i.e., the ARP values and/or subscription priority values do not exceed the threshold value(s). For example, if UE 210 has a PCI value of 0 (i.e., UE 210 is not capable of preemption) instead of 1, the Context information may not be stored for UE 210 by eNB 320.

Referring to FIG. 8, assume that while UE 210 is in the RRC inactive state, eNB 320 detects congestion and/or overload conditions in the RAN (block 810; FIG. 7, 759). Alternatively, the congestion/overload determination may be made at any time, for example, after the attach accept 750. Assume further that UE 210, while in the inactive state and before transition to an idle state, sends an RRC Resume Request message to eNB 320 (block 820; FIG. 7, 760). For example, UE 210 may send the request within an amount of time that is less than a threshold of inactive time for being placed in an RRC idle state, i.e., disconnected.

eNB 320 receives the RRC Resume Request message and determines whether, in view of the congestion/overload state of the RAN, eNB 320 is to preempt one or more other bearers and transition UE 210 from the RRC inactive state to the RRC connected state (block 830; FIG. 7, 770). In making the determination, eNB 320 uses the Context information for UE 210 that is stored by eNB 320. For example, eNB 320 may identify the ARP parameter values and/or the subscription priority information associated with UE 210. For example, eNB 320 may determine that the ARP parameter values for UE 210, associated with a public safety agency, include a PCI value of 1, and a PL value that is between 1-14 (where a PL value of 1 is the highest priority and a PL value of 15 is the lowest priority). eNB 220 may identify one or more bearers (i.e., UEs 210 in a connected, RRC active state on the RAN), which are susceptible to preemption (i.e., PVI=1) and that have a PL value that is inferior (i.e., PL=2-15) to that of UE 210. eNB 320 may preempt the identified bearer(s) to enable UE 110 to access the RAN, i.e., transition from the inactive state to the connected, RRC active state. For example, eNB 320 may preempt the identified bearer(s) in any number of ways, including disconnecting the bearer, modifying (e.g., degrading) the connection, directing handover to another eNB 320, or any other form of preempting the bearer to prioritize access to the RAN by UE 210.

Based on the results of the preemption decision, if eNB 320 decides that UE 210 is to be denied prioritized access (block 830—NO), eNB 320 may deny the RRC Resume Request (block 840) and may transmit a reject response to UE 210 (block 850). When the preemption decision is that UE 210 is to be granted prioritized access (block 830—YES), eNB 320 provides an RRC Resume message to UE 210 and the identified low priority bearer(s) is preempted (block 860; FIG. 7, 780). UE 210 may receive the RRC Resume message and transmit an RRC Resume Complete message (FIG. 7, 790) to eNB 320. At this point, one or more SRBs are allocated between eNB 320 and UE 210 and UE 210 transitions to the RRC active state (block 870).

Alternatively, for UE 210 that transitioned to the RRC idle state in block 660, eNB 320 may detect congestion and/or overload conditions in the RAN (block 900; FIG. 7, 759). eNB may receive an RRC connection request from UE 210 (block 910), substantially as described above with respect to FIG. 7, 780. In response, eNB 320 may allocate an SRB and perform RRC connection setup and the RRC connection completed substantially as described above with respect to FIG. 7, 715, 720. eNB 320 may exchange messages with the core network to perform initial context setup and receive ARP data and subscriber priority information for UE 210 substantially as described above with respect to FIGS. 7, 730, 740, 745, and 750.

eNB 320 determines whether, in view of the congestion/overload state of the RAN, eNB 320 is to preempt one or more other bearers and transition UE 210 from the RRC inactive state to the RRC connected state (block 950; FIG. 7, 770). In making the determination, eNB 320 uses the Context information for UE 210 that is received from the core network. If eNB 320 determines that UE 210 is not eligible to preempt any existing bearer in the RAN, the RRC connection is releases or redirected (block 960), for example, to another eNB, i.e., handover to another cell, and the SRB is torn down. If eNB 210 determines that UE 210 is eligible to preempt a low priority UE 210, eNB 320 may preempt the existing bearer in the RAN (block 970).

In the examples above, it was assumed that UE 210, after being connected to eNB 320, had activated other services that resulted in the creation of one or more DRBs, and thus the Context information included ARP parameter values (that were later used to determine access prioritization). However, in other instances UE 210 may not activate services that require DRB creation and thus the Context information may not include any ARP parameter values. In this scenario, when a resume request is received from UE 210 from the RRC inactive state, eNB 320 may use subscription priority information stored by eNB 320, which was provided by, for example, PCRF 370 during initial RRC connection establishment. The subscription priority information may be used, for example, to verify an Access Class claimed by UE 210.

Implementations described herein provide for controlling prioritized access to network resources in a RAN based on access point name (APN)-level data and/or UE-level prioritization information stored at the RAN. By controlling prioritized access to RAN resources, the RAN may avoid overloading the RAN with SRB creation and network traffic in prioritized connection determinations. This in turn results in less network congestion and increased network capacity. Controlling prioritized accesses also helps protect a network from intentional or improper use of prioritized network access requests that can limit other devices' ability to access the network. In addition, utilization of UE Context stored in the RAN as part of RRC inactive/User Plane Optimization state to apply prioritization and preemption during RRC Connection establishment may reduce delay and increase the accuracy of prioritization decisions.

In some implementations, the Resume Request may include Access Class information for UE 210. eNB 320 may use the Context, the subscription information for example, to verify the identified Access Class associated with UE 210.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

Lastly, while series of acts have been described with respect to FIGS. 6, 8, and 9, and signal flows with respect to FIG. 7, the order of the acts and signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

What is claimed is:

1. A method comprising:
   receiving, at a radio access network (RAN), a radio resource control (RRC) connection request from a user equipment (UE) device in a disconnected state or an idle state;
   allocating, by the RAN, signaling radio bearer (SRB) resources to the UE device;
   sending, by the RAN, an initial UE message to a core network;
   receiving, at the RAN in response to the initial UE message, an initial context set-up from the core network;
   establishing, by the RAN and using context information from the initial context set-up, an RRC session with the UE device in an RRC connected state;
   storing, at the RAN, the context information;
   detecting, by the RAN, a period of inactivity in the RRC session while the UE device is in the RRC connected state;
   suspending, by the RAN, the RRC session and transitioning the UE device from the RRC connected state to an RRC inactive state based on a determination that the period of inactivity exceeds a first threshold amount of time;
   determining, by the RAN, that at least one of a congested state or an overloaded state exists in the RAN;
   receiving, by the RAN, an RRC resume request from the UE device while the RAN is in the at least one of the congested state or the overloaded state; and
   determining, by the RAN and using the stored context information and without messaging the core network, whether the UE device is to be granted access to the RAN and transitioned to the RRC connected state.

2. The method of claim 1, wherein the RAN comprises: an evolved Node B (eNodeB) or a next generation NodeB (gNodeB).

3. The method of claim 1, further comprising:
   allocating data radio bearer (DRB) resources for the UE device for use in the RRC session,
   wherein the context information includes allocation and retention priority (ARP) parameter values for the DRB resources, which are received from a policy charging rules function (PCRF).

4. The method of claim 3, further comprising:
   determining whether the UE device is eligible for prioritized access to the RAN,
   wherein storing the context information is based upon a determination that the UE device is eligible for the prioritized access.

5. The method of claim 4, wherein determining whether the UE device is eligible for prioritized access comprises determining, from the ARP parameter values, a preemption capability information (PCI) value and a prioritization level (PL) value.

6. The method of claim 1, wherein determining whether the UE device is to be granted access to the RAN is further determined without allocating other SRB resources to the UE device.

7. The method of claim 1, further comprising:
   receiving, in response to the initial UE message, subscription priority information for the UE device,
   wherein determining whether the UE device is to be granted access to the RAN further comprises using the subscription priority information.

8. The method of claim 7, wherein the RRC resume request includes an access class for the UE device, the method further comprising:
   comparing the access class to the subscription priority information.

9. The method of claim 1, wherein receiving the RRC resume request comprises:
   receiving the RRC resume request before the period of inactivity exceeds a second threshold of time beyond which the UE device is to be transitioned to an RRC idle state.

10. The method of claim 1, further comprising:
    determining that the UE device is not to be granted access to the RAN based on a preemption capability information (PCI) value of zero included in the context information.

11. A system, comprising:
    a memory;
    a communication interface; and
    at least one device configured to:
       receive a radio resource control (RRC) connection request from a user equipment (UE) device in a disconnected state or an idle state;
       allocate signaling radio bearer (SRB) resources to the UE device;
       send an initial UE message to a core network;
       receive, in response to the initial UE message, an initial context set-up from the core network;
       establish, using context information from the initial context set-up, an RRC session with the UE device in an RRC connected state;
       store the context information;
       detect a period of inactivity in the RRC session while the UE device is in the RRC connected state;
       suspend the RRC session and transition the UE device from the RRC connected state to an RRC inactive state based on a determination that the period of inactivity exceeds a first threshold amount of time;

determine that at least one of a congested state or an overloaded state exists in the RAN;

receive an RRC resume request from the UE device while the RAN is in the at least one of the congested state or the overloaded state; and determine, using the stored context information and without allocating other SRB resources to the UE device, whether the UE device is to be granted access to the RAN and transitioned to the RRC connected state.

12. The system of claim 11, wherein the at least one device comprises an evolved Node B (eNodeB) or a next generation NodeB (gNodeB).

13. The system of claim 11, wherein the at least one device is further configured to:

allocate data radio bearer (DRB) resources for the UE device for use in the RRC session, wherein the context information includes allocation and retention priority (ARP) parameter values for the DRB resources, which are received from a policy charging rules function (PCRF).

14. The system of claim 13, wherein the at least one device is further configured to:

determine whether the UE device is eligible for prioritized access to the RAN, wherein storing the context information is based upon a determination that the UE device is eligible for the prioritized access.

15. The system of claim 14, wherein when determining whether the UE device is eligible for prioritized access, the at least one device is configured to:

determine, from the ARP parameter values, a preemption capability information (PCI) value and a prioritization level (PL) value.

16. The system of claim 11, wherein the at least one device is further configured to:

receive, in response to the initial UE message, subscription priority information for the UE device, wherein when determining whether the UE device is to be granted access to the RAN, the at least one device is further configured to use the subscription priority information.

17. The system of claim 16, wherein the RRC resume request includes an access class for the UE device, and wherein the at least one device is further configured to:

compare the access class to the subscription priority information.

18. The system of claim 11, wherein the at least one device is further configured to determine whether the UE device is to be granted access to the RAN without messaging the core network.

19. A non-transitory computer-readable medium having stored thereon sequences of instructions which, when executed by at least one processor of a network device, cause the at least one processor to:

receive, at the network device, a radio resource control (RRC) connection request from a user equipment (UE) device in a disconnected state or an idle state;

allocate signaling radio bearer (SRB) resources to the UE device;

send an initial UE message to a core network;

receive, in response to the initial UE message, an initial context set-up from the core network;

establish, using context information from the initial context set-up, an RRC session with the UE device in an RRC connected state;

store, at the network device, the context information;

detect a period of inactivity in the RRC session while the UE device is in the RRC connected state;

suspend the RRC session and transition the UE device from the RRC connected state to an RRC inactive state based on a determination that the period of inactivity exceeds a first threshold amount of time;

determine that at least one of a congested state or an overload state exists in the RAN;

receive, at the network device and before the period of inactivity exceeds a second threshold of time beyond which the UE device is to be transitioned to an RRC idle state, an RRC resume request from the UE device while the RAN is in the at least one of the congested state or the overload state; and determine, using the stored context information, whether the UE device is to be granted access to the RAN and transitioned to the RRC connected state.

20. The non-transitory computer-readable medium having of claim 19, wherein the network device comprises an evolved Node B (eNodeB) or a next generation NodeB (gNodeB).

* * * * *